United States Patent
Morris

(10) Patent No.: US 8,595,106 B2
(45) Date of Patent: Nov. 26, 2013

(54) SYSTEM AND METHOD FOR DETECTING FRAUDULENT FINANCIAL TRANSACTIONS

(76) Inventor: Steven R. Morris, Durham, OR (US)

(*) Notice: Subject to any disclaimer, the term of this patent is extended or adjusted under 35 U.S.C. 154(b) by 17 days.

(21) Appl. No.: 13/194,602

(22) Filed: Jul. 29, 2011

(65) Prior Publication Data

US 2013/0031000 A1 Jan. 31, 2013

(51) Int. Cl.
*G06Q 40/00* (2012.01)

(52) U.S. Cl.
USPC .......................................................... 705/35

(58) Field of Classification Search
USPC ............................ 705/35–45; 709/299; 718/1
See application file for complete search history.

(56) References Cited

U.S. PATENT DOCUMENTS

| | | | |
|---|---|---|---|
| 8,387,045 B2 * | 2/2013 | Yasutaka et al. | 718/1 |
| 2007/0234302 A1 * | 10/2007 | Suzuki et al. | 717/126 |

OTHER PUBLICATIONS

The Java Virtual Machine, http://docs.oracle.com/javase/specs/jvms/se7/html/index.html.*
The Java Virtual Machine, http://docs.oracle.com/javase/specs/jvms/se7/html/index.htm, 2013.*
J. Zackrisson et al., OpenLabs Security Laborator—The Online Security Experiment Platform, vol. 4 Jul. 2008.*

* cited by examiner

*Primary Examiner* — Richard C Weisberger
(74) *Attorney, Agent, or Firm* — Mersenne Law LLC

(57) ABSTRACT

An Internet service provider uses virtual machines dedicated to one (or a few) customers to perform transactions on behalf of those customers, where the transactions require sensitive or confidential user authentication data. Each virtual machine only has access to the user authentication data it needs to perform the transactions for its dedicated customers, not authentication data for all the customers of the service provider. Virtual machines are shut clown when not performing transactions or interacting with customers, thus further reducing the risk of disclosure of the confidential user authentication data.

16 Claims, 7 Drawing Sheets

SYSTEM AND METHOD FOR DETECTING FRAUDULENT FINANCIAL TRANSACTIONS

PRIORITY CLAIM AND RELATED APPLICATIONS

This is an original U.S. Patent Application.

FIELD

The invention relates to collection, review and analysis of financial transaction data. More specifically, the invention relates to methods for improving the accuracy, timeliness and security of financial transaction review, tagging and fraud detection.

BACKGROUND

A wide variety of activities, interactions and transactions are conducted via communication between computers over a distributed data network such as the Internet. FIG. 2 shows a representative distributed data processing environment where such communication occurs. A number of different computers 150, 210 (or multi-computer data processing centers 220) are all connected to a "network of networks" often illustrated as a cloud 230. Each computer has an address (usually but not invariably unique) and all the computers and network devices (e.g. routers 221, gateways, modems 215 and switches) cooperate to accomplish the low-level goal of delivering data from one endpoint to another, while various pairs of computers cooperate at a higher level to accomplish other ends. Thus, a program executing at any computer is likely to be able to communicate with another program executing at a different computer, although it is appreciated that such communication depends on the machines being capable of (and instructed to) participate in higher-level communication protocols, and to do so at the same time. For example, a web browser 255 at a client computer 150 may be able to communicate with a web server 260 at a computer operated by bank 120 to retrieve account transaction and balance information for display to a user 160.

Many intra-computer interactions are initiated by a user (e.g., by clicking a hyperlink or pressing "play" on a streaming-media receiver), but a significant fraction occur automatically (e.g., on a set temporal schedule), without any human involvement. For many interactions, the difference is immaterial, but some protocols have a security or authentication component, where one side or the other sends sensitive information such as a username, password, or account number. When such sensitive information is needed in the course of an automatically-initiated transaction, the information must be stored (essentially) in unprotected form (i.e., in plaintext). (Of course, the sensitive information may be encrypted, but the automatic process must then have the password to decrypt it, so an attacker need only refocus its attentions slightly. Or, if the service provider takes on the burden of protecting the sensitive information itself, by using hardware encryption or a password entered by one of its employees, then the security of the system depends on the trustworthiness of the service provider and its employees.) By way of contrast, when a person initiates his own transactions, the system can obtain the password interactively. The sensitive information (or the password to access the sensitive information) need not be stored on the computer. It is still possible for the password to be stolen, but an attacker's window of opportunity is reduced. If the sensitive information (and/or the password to the sensitive information) is stored somewhere that it can be accessed automatically, then an attacker can get the information whenever he has the opportunity to do so, and can analyze or decrypt it at his leisure. Also, in the latter situation, the attacker's acquisition of the data is often less likely to be noticed timely, so the passwords or other stolen information may remain valid for a longer time.

The foregoing problems are magnified when an automatic computer service aggregates periodic, password-requiring activities for a number of different users. For example, a financial status monitoring service that accepts bank passwords from many users, and then checks those users' accounts regularly to prepare aggregate reports, becomes a much more attractive target for attackers since a successful attack may yield hundreds or thousands of security credentials. Procedures and protocols that improve the attack resistance of automatic credential-using activities may be of significant value for many computer services.

SUMMARY

User credentials or similar authentication information for large numbers of users can be safely stored and used in automatic processes by storing a single user's credentials in a dedicated web site (i.e., a web site dedicated to that user). Credentials may allow the automatic process to log into other web sites, such as financial institution web sites, and retrieve information about transactions that the user has participated in. The dedicated web site can produce aggregate reports for the user, or take other actions based on the information retrieved using the credentials.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention provide a method for an automatic, possibly periodic process to access sensitive data necessary to perform the process, with a reduced risk that the sensitive data will be exposed to unwanted or malicious inspection. Portions of the method (and alternative implementations) will be described in the context of a useful practical application, the retrieval and analysis of financial transaction data.

Figure 1:
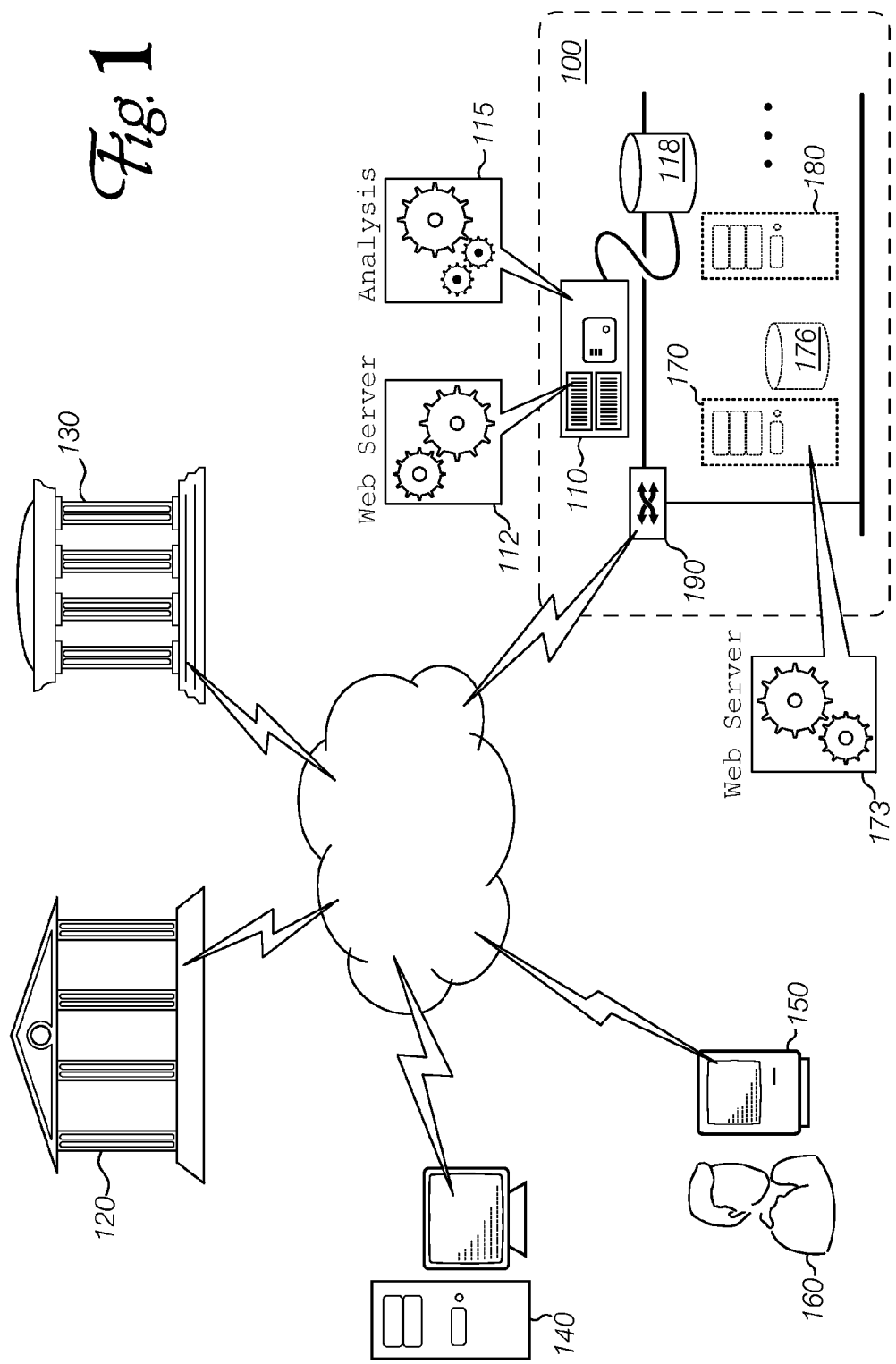
FIG. 1 shows an environment where an embodiment of the invention can be implemented.
Figure 2:
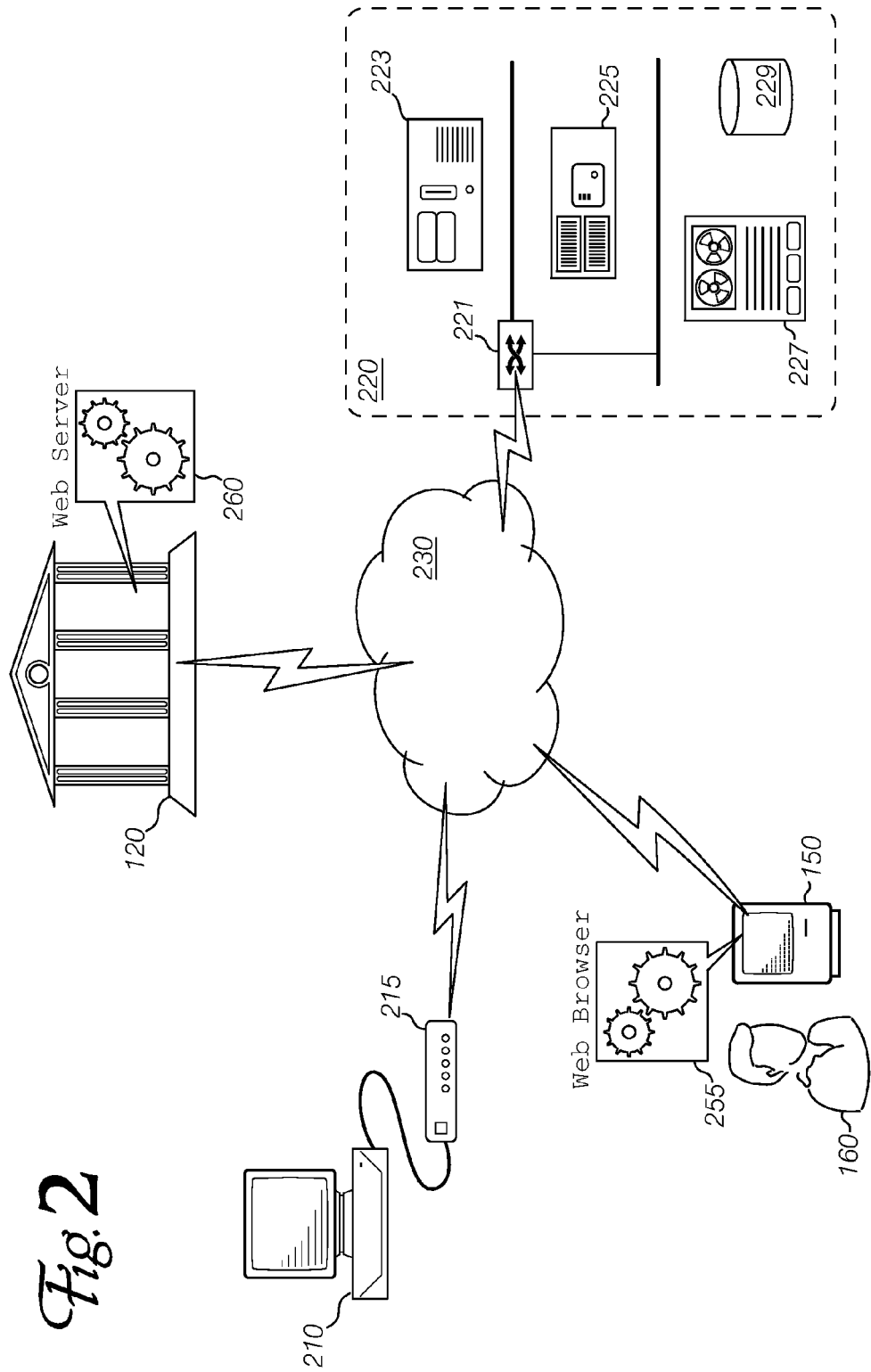
FIG. 2 shows a general distributed data communication network and computing environment.

FIG. 1 shows a subset of the general distributed data processing environment of FIG. 2. A service provider 100 operates a website 112 and related computer program(s) 115 at a main server computer 110. The service provider's overall function is to collect information from financial institutions 120, 130 and provide access to end users at client computers 140, 150. In this example system, information is collected on a regular schedule, for example daily, and a message (e.g., electronic mail or SMS text message) is sent to a user 160 whose financial institution(s) report one or more transactions since a previous message to the user. The message invites the user to visit a website or similar electronic service, where he can review the recent transactions, verify that they are all expected, and assign tax or budget tracking notes. Since the system provides regular, frequent notifications and opportunity to review transactions soon after the transaction is performed, the user is more likely to remember important details and make accurate, useful annotations. Furthermore, in comparison to a weekly or monthly review of posted transactions, the smaller number of transactions should be less daunting and easier to deal with, leading to the collection of better data with less effort. An added benefit of frequent review and reporting is that fraudulent transactions may be detected sooner, providing an opportunity to disable further transactions and dispute the fraudulent activities.

A problem faced by service provider 100 is that its computer programs 112, 116 must automatically log into its users' financial institutions' websites to collect transaction data, and therefore the users' passwords (or similar credentials) must be available when the transaction data is to be collected. The service provider can reduce the risk to sensitive data such as passwords and authentication credentials by conducting its operations according to an embodiment of the invention as outlined below. Generally speaking, an embodiment works by dissipating or distributing information that would be a high-value target for attackers (i.e., a database containing bank credentials for many users) among many smaller, less-attractive targets. These smaller targets can also be protected by measures that would not be practical to use on a single computer system that was responsible for serving all the users.

In greater detail, an embodiment creates individual websites 173 for each user (or for small groups of users). These websites have access to the authentication credentials they need to collect transaction data for their user(s), but not to authentication credentials for other users. Thus, they are less-attractive targets for attackers, in comparison to conventional websites and service providers that store passwords, authentication information and/or sensitive data for many users. The latter is common practice today.

The individual (or small group) websites can be protected by low-level network access controls or by higher-level techniques such as obscured or transient domain names, as described below. Also, in some embodiments, an individual website can be configured to interact with a security device in the user's possession or control before being granted permission (or ability) to use the authentication credentials to download financial transaction data. The security device could be, for example, the user's personal computer, a smart phone, or a specialized Internet appliance. By adding this step to what is otherwise an automatic process using authentication credentials, the security of the process can be improved.

Figure 3:
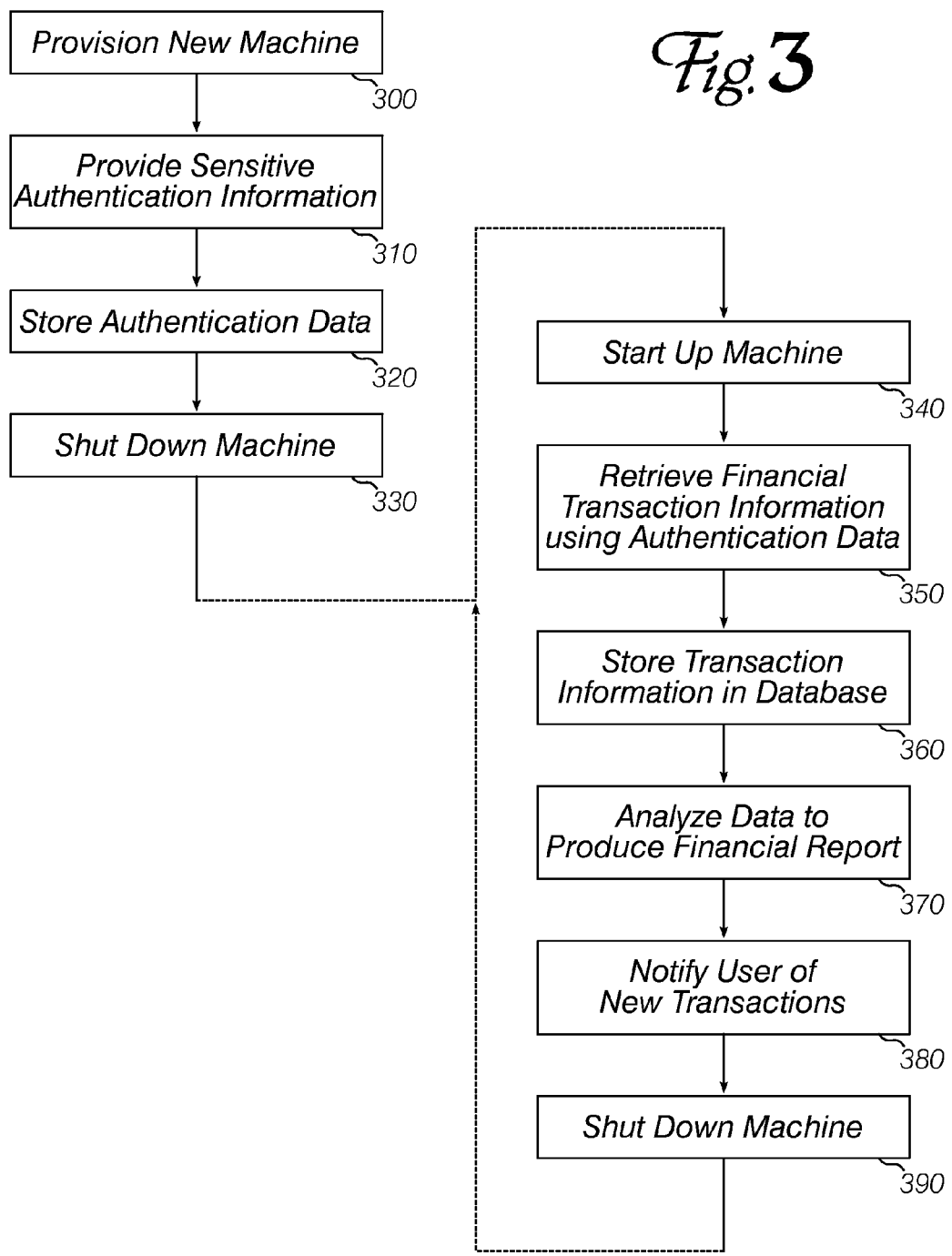
FIG. 3 outlines operations of an embodiment of the invention.

Turning now to FIG. 3, when a user is enrolled, a complete machine (computer) is provisioned, which is dedicated to collecting and processing the user's financial data (300). It is appreciated that allocating separate physical hardware for each individual user is likely to be infeasible (for economic, space and power reasons, at least) but the development and widespread availability of virtual computing platforms renders this provisioning step possible. Thus, the "provisioning" step in an embodiment may be simply allocating an amount of data storage sufficient to contain a virtual system image, and then launching or "booting" that image on a virtual machine. Referring briefly to FIG. 1, computers 170 and 180 are shown in clashed lines not to indicate that they are optional, but to suggest that they may be virtual machines.

Once the dedicated computer is running, it is provided with the sensitive authentication data it will need to retrieve information from the user's financial institutions (310). For example, the user may connect to a website 173 at the dedicated computer 170 and enter his bank names, account numbers, usernames and passwords and so on. This information is stored in the virtual machine image (e.g., on a filesystem 176 that is part of the image) (320). Then, the virtual machine is shut clown (330).

Later (for example, on a periodic schedule), the virtual machine is started (340) and automatic software uses the authentication data to retrieve transaction information from the user's financial institutions (350). This information may be stored in a database (360), analyzed to produce a report (370), or used to trigger a notification to the user (380). For example, the detection of one or more recent transactions may cause a message to be sent to the user, inviting him to visit the website and verify the transactions or attach tax or budget notes. Once the periodic tasks are complete, the virtual machine is shut clown again (390).

The foregoing method of a basic embodiment of the invention improves the security of a user's authentication credentials by reducing the amount of time that the credentials are exposed to possible attack. When the virtual machine is shut clown, an attacker cannot probe the machine's defenses by attempting to connect to and subvert the running software. Furthermore, while the virtual machine is running, an attacker who manages to gain access to it will only obtain credentials of the user to whom the machine is dedicated (not all the users served by the service provider). The end result is a significant reduction in both the attackable surface of the system and the value of a successful attack.

It is appreciated that an attacker might focus instead on retrieving the dormant machine images, from which it could attempt to extract the corresponding authentication credentials. However, while the virtual machine is inactive, protecting the corresponding machine image is an ordinary data storage/security problem, and many conventional techniques are effective. For example, the virtual machine could be configured to use encrypted filesystems, and the machine images themselves could be encrypted again while stored on physical mass storage devices (e.g., in the service provider's data center). Since each user independently controls the creation and (largely) the operation of their own storage on their own website and there is no centralized storage of decryption credentials, a hacker would have to find and attack each user's dedicated site independently. The combination of distributed credentials and strong encryption results in this type of website not being an attractive target for hackers.

For added security, an element of randomness can be introduced into the provisioning process so that client authentication data is stored at different locations in each virtual machine image. The images are significantly larger than the crucial authentication information they contain, so they present a needle-in-a-haystack problem for an attacker, who (even if he gains access to the image) may not have flexible enough access to search through the image for the interesting information, or enough communication bandwidth to download many users' dedicated machine images in toto.

Finally, although in many embodiments, the virtual machine images must ultimately be able to start up automatically and use the authentication data without human intervention, environment-specific checks can be built into the virtual machine boot process to limit the amount of information an attacker can obtain, even if he manages to acquire a machine image. For example, a hardware key, present only in the proper virtual machine environment, may prevent successful decryption of the virtual system's encrypted filesystems if the image is booted elsewhere, or the boot-up process may depend on receiving an authenticated communication from a security control system at the service provider or a system controlled by the user. Given enough time, information and resources, an attacker may be able to defeat these measures, but the attempts to do so should trigger tampering warnings and give the service provider ample opportunity to warn its users to change their bank passwords. By way of contrast, simply storing all the users' bank credentials in a database (even if the database is protected or encrypted) is vastly inferior, since the once the credentials are exposed, the attacker can download them en masse, decipher them at leisure and use them unobtrusively, so as to avoid detection for as long as possible.

Figure 4:
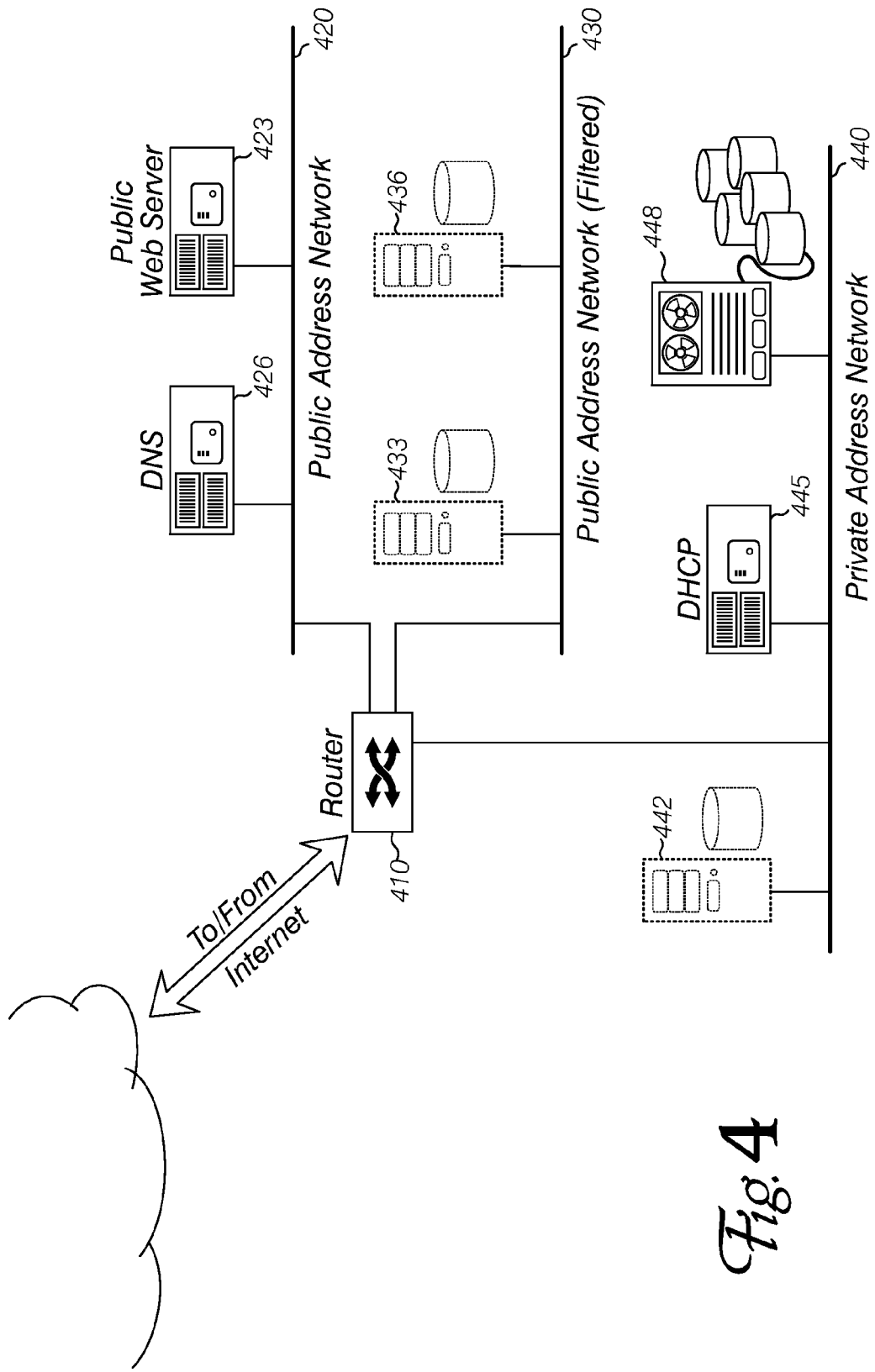
FIG. 4 shows some details of a service provider's network where an embodiment of the invention is used.

Some embodiments of the invention may employ additional measures to guard against attacks on the individual virtual machines. Generally speaking, these measures operate by restricting network communications of the virtual machines while they are in operation so that they are less likely to be accessed by malicious agents. To understand these measures, it helps to have a specific network topology in mind. FIG. 4 shows one network map that will support enhanced-security embodiments. A router or gateway 410 serves as the entrance to the service provider's network domain. Internally, the network may have portions with public addresses 420, portions with public addresses that are filtered to restrict inbound or outbound traffic 430, and/or portions that have private addresses 440.

On the public network, servers such as a public web server 423 or a Domain Name System ("DNS") server 426 may provide information and services in response to requests from clients on the Internet. Virtual machines dedicated to serving one (or a few) clients may be active on the filtered public network 430 (VMs 433 and 436) or on the private network 440 (VM 442). DHCP service may be provided by router 410 or by another device 445. A file server 448 may store inactive virtual machine images and other information produced or used by the systems performing the services offered.

Figure 5:
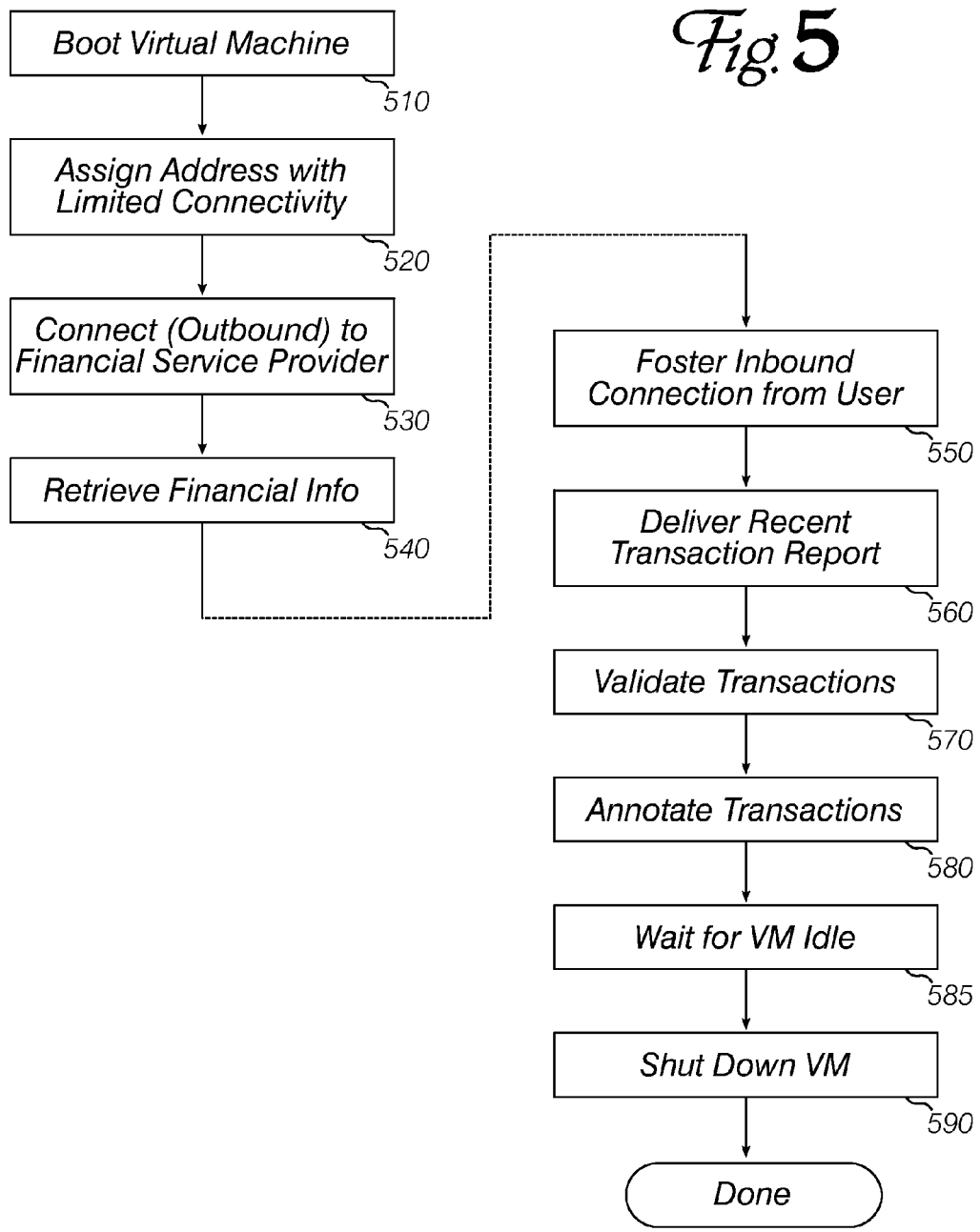
FIG. 5 outlines another series of operations according to an embodiment.

Turning now to FIG. 5, a method of an embodiment is outlined. A virtual machine that is dedicated to monitoring the financial accounts of a user is started (510). This may be a periodic activation to retrieve recent transaction information, an activation in response to the user's request to review his accounts, or an activation for another system purpose. The virtual machine is allocated a network communication address (e.g., an Internet Protocol ["IP"] address) that is difficult or impossible to reach from outside the service provider's networks (520). Addresses may be configured into the virtual machine image, provided upon system startup, or acquired from an automatic address assigning service such as a Dynamic Host Configuration Protocol ("DHCP") server. An IP address in one of the private ranges defined in Request For Comments document number 1918 ("RFC 1918") cannot be reached from outside the service provider's network because such destination addresses are not generally routable over the public Internet. Even a non-private IP address may be difficult to reach from outside the network if it is not associated with a publicly-available name in the Domain Name System ("DNS"). Other means of filtering data connections can also be used to make the virtual machine difficult or impossible to reach from outside the service provider's network. Generally, it is preferable for the virtual machine's address to be unpredictable or indeterminate from the perspective of an outside observer. Unpredictable addresses improve the stealth with which the virtual machine can be activated, conduct its business, and return to an inactive or dormant state.

Note, however, that despite the unreachable or filtered condition of the address, the virtual machine can initiate connections from inside the service provider's network to computers outside the network more or less freely. For example, if the virtual machine has a private IP address, a Network Address Translation ("NAT") facility on a router at the service provider can set up an attempted connection and serve as the apparent endpoint of the connection from the point of view of computers elsewhere on the network. The NAT-providing router can pass the data packets through to the virtual machine at its private address. Thus, the virtual machine can establish outbound connections to the user's financial service providers' computers (530) and retrieve transaction information (540).

On the other hand, when it is desired to permit an inbound connection to be made to the virtual machine, additional steps may be necessary. For example, if the virtual machine has a private IP address, a router with a public IP address may be configured to accept packets for the virtual machine at a particular port and then forward the packets on. If the virtual machine has a public, routable but unnamed IP address, then a transient DNS name entry can be made, and the temporary name provided to the computer that is to be allowed access. The temporary name may include a random portion so that an attacker is unlikely to be able to find the virtual machine simply by guessing names. A third alternative is to reverse the connection-initiation process, so that although an "external" machine wishes to establish the connection, it is actually the virtual machine that creates the new connection to a receiving socket on the external machine. Any of these techniques can be seen as "fostering" a connection between the external machine and the virtual machine (550): arranging for the machines to be able to communicate, in an environment where it would be difficult or impossible for the machines to establish the connection without assistance. Once the connection is established, the external computer may, for example, request and retrieve a report on recent financial transactions (560), mark transactions as valid or fraudulent (570), and/or annotate transactions with budgetary or tax information (580).

As in other procedures involving the virtual machine, once a task has been completed, the virtual machine is shut down (590). In some embodiments, shutdown may be delayed until the virtual machine has been idle for a few minutes (585), to avoid delays attendant to start up and shut down activities.

It is appreciated that reports of recent financial transactions are somewhat sensitive—they may contain balance or credit-limit information—but they may not have to be protected as carefully as the users' financial authentication credentials. Thus, in some embodiments, the intermittently-activated virtual machines may retrieve recent transactions and prepare reports that are stored on an always-on, public web server. Access to these reports should, of course, be limited to the users to which they pertain, but because of the less-sensitive nature of the reports, conventional username/password protection may be adequate. Furthermore, the budgetary or tax annotations can be accepted by an always-on, public web server (rather than starting the dedicated virtual machine to receive these reports). In one embodiment, a user may receive an electronic-mail report of recent transactions, and provide verification/annotation information by return email. In another embodiment, an SMS text message may contain recent-transaction notices, and a reply SMS message from the user may provide the annotation. In a hybrid web/email embodiment, the email notification may provide an obfuscated, but not authenticated, hyperlink to allow the user to submit an annotation. The security in such a system is provided by the user's email: if an attacker cannot access the user's email, then it will be unable to submit bogus annotations. (Even if the attacker can access the user's email, the damage it can do is limited to submitting false or misleading notes. The core transaction data—date, amount, account number etc.—should never be modified through the public web server, and in fact, it may not even be stored there.) This risk tradeoff may be acceptable in view of the simpler and faster access that can be offered. Annotations and/or validations received by the public web server (or other receiver) can be delivered to the user's dedicated virtual machine the next time it is activated. At that time, the information can be added to a database containing more comprehensive financial information collected by the virtual machine.

Figure 6:
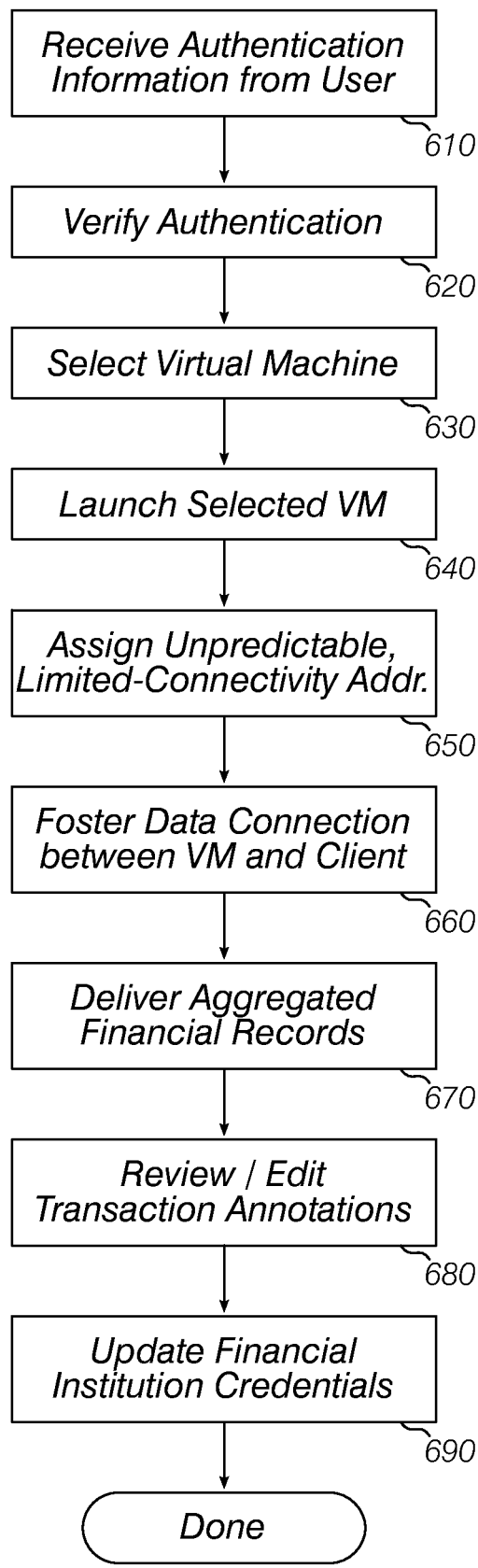
FIG. 6 shows operations of an embodiment to select a virtual machine to provide service to a user.
Figure 7:
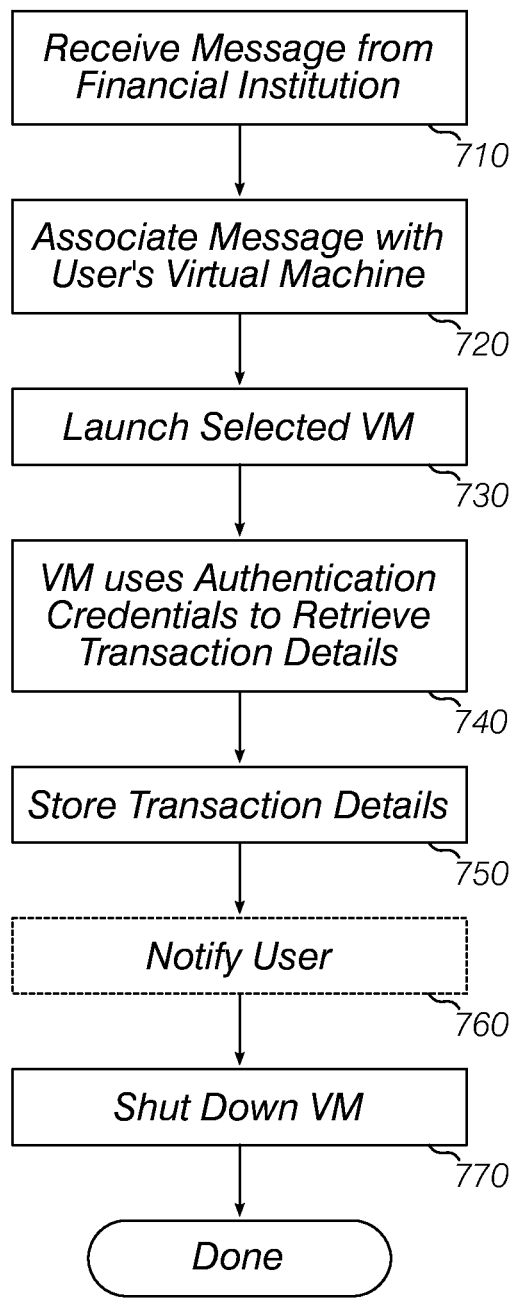
FIG. 7 shows how a virtual machine can accept an automatically-generated message from, e.g., a financial institution.

FIGS. 6 and 7 outline methods that may be performed by a service provider that implements an embodiment of the invention by creating dedicated websites or web services to act on behalf of a user, where the website or web service needs to use authentication credentials or other sensitive information of the user to perform its tasks. FIG. 6 covers the selection and activation of a virtual machine in response to a user's request. For example, a user may log into a general-purpose website of the service provider, and then request to see financial data or analyses that have not been prepared in advance or stored at the main website (as discussed in [0033]).

First, authentication information is received from the user at a client computer (610). This information allows the user to log into the service provider's website; it may be different from the financial account authentication information stored in the user's dedicated, intermittently-activated website. The authentication information is verified (620), perhaps by checking it against a database of known users and passwords. The database also contains information to select a virtual machine image associated with the user. This information is used to select an inactive virtual machine image (630), and the machine image is launched or "booted" to cause it to begin executing (640). As explained above, the running virtual image is given a network address with limited connectivity (650). For example, it may be provided such an address as part of the booting process, the address may be configured into the machine image, or it may acquire the address from a DHCP server on the network. Preferably, the address is indeterminate or unpredictable from the perspective of an outside observer.

Once the virtual machine image has started executing and has bound to its network address, the service provider fosters a data connection between the client computer and the virtual machine (660). Fostering can be setting an IP forwarding rule in a router or gateway, activating a DNS entry, or triggering a reverse (virtual machine to client computer) connection. Thereafter, the client computer can communicate with the virtual machine and retrieve the user's aggregated financial records (670), review or edit transaction annotations (680), or add or change financial institution authentication credentials or policies (690).

FIG. 7 outlines another circumstance under which a virtual machine may be activated. As described above, in some embodiments, virtual machines are activated periodically to retrieve recent transaction information. However, it is also possible that a financial institution will send a message to the service provider, notifying it of activity in the account of one of the service provider's customers. For example, a user may configure his bank's notification process to send an electronic mail message to an email address associated with the user at the service provider. The service provider would receive a message indicating a financial transaction involving the user (710) and locate a virtual machine image associated with the user (720). The virtual machine image is booted (730) if it is not already running, and its startup procedures or conditions are set to cause it to contact the financial institution to obtain further details about the activity referred to in the message (740). (The virtual machine may need to use the user's authentication credentials to download these details.) The details are stored in the virtual machine's databases (750) and may cause a notification to be sent to the user (760). Thereafter, the virtual machine may shut down (770).

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that improved transaction review and fraud detection can also be produced by software and hardware that distribute the functions of embodiments of this invention differently than herein described. Such variations and implementations are understood to be captured according to the following claims.

I claim:

1. A method comprising:
   receiving authentication information from a user at a client computer;
   verifying the authentication information;
   selecting an inactive virtual machine image based on the authentication information;
   launching the inactive virtual machine image into an active execution environment, said launching to lead to associating a limited-connectivity Internet Protocol ("IP") address with the active execution environment; and
   fostering an IP connection between the client computer and the active execution environment.

2. The method of claim 1, further comprising:
   receiving a message indicating a financial transaction involving the user;
   locating the inactive virtual machine image based on the message;
   launching the inactive virtual machine image into a second active execution environment, wherein
   said launching into the second active execution environment is to cause the second active execution environment to obtain further details about the financial transaction and then to terminate said second active execution environment.

3. The method of claim 1, further comprising:
   receiving a message from an automatic computer agent associated with the user;
   locating the inactive virtual machine image based on the message;
   launching the inactive virtual machine image into a second active execution environment; and
   using authentication information from the automatic computer agent to retrieve financial transaction information concerning the user from an online data service of a financial institution.

4. The method of claim 1, further comprising:
   transmitting an invitation to the user to cause the user to send the authentication information.

5. The method of claim 4 wherein the invitation is an electronic mail message.

6. The method of claim 4 wherein the invitation is a Small Message Service ("SMS") text message.

7. The method of claim 1 wherein launching comprises decrypting a portion of the inactive virtual machine image.

8. The method of claim 1 wherein fostering comprises:
   associating a temporary Domain Name System ("DNS") name with the limited-connectivity IP address; and
   transmitting the temporary DNS name to the client.

9. The method of claim 1 wherein the limited-connectivity IP address is a private IP address, and wherein fostering comprises:
   directing the active execution environment to establish a connection with an IP address of the client.

10. A system comprising:
    a shared Internet data server accessible at a public Internet Protocol ("IP") address;
    a plurality of machine images, each machine image associated with a customer of a plurality of customers and each machine image containing an authentication credential of the customer; and
    triggering logic to activate one of the plurality of machine images in a virtual machine if a triggering event occurs, wherein
    the activated machine image in the virtual machine is to exchange data with a remote data server by using the authentication credential of the customer.

11. The system of claim 10 wherein the triggering logic is to activate the one of the plurality of machine images on a periodic schedule.

12. The system of claim 10 wherein the triggering logic is to activate the one of the plurality of machine images if the customer identifies himself to the shared Internet data server.

13. The system of claim 10 wherein the triggering logic is to activate the one of the plurality of machine images if a message identifying the customer is received from the remote data server.

14. The system of claim 10 wherein the virtual machine executing one of the machine images has a limited-connectivity network connection.

15. The system of claim 14 wherein the limited-connectivity network connection is one of a private Internet Protocol ("IP") address or a public IP address associated with a transient Domain Name System ("DNS") name.

16. The system of claim 10 wherein one of the machine images contains a plurality of authentication credentials for the associated customer, each authentication credential permitting a virtual machine executing the one of the machine images to exchange data with a different remote data server.

* * * * *